UNITED STATES PATENT OFFICE.

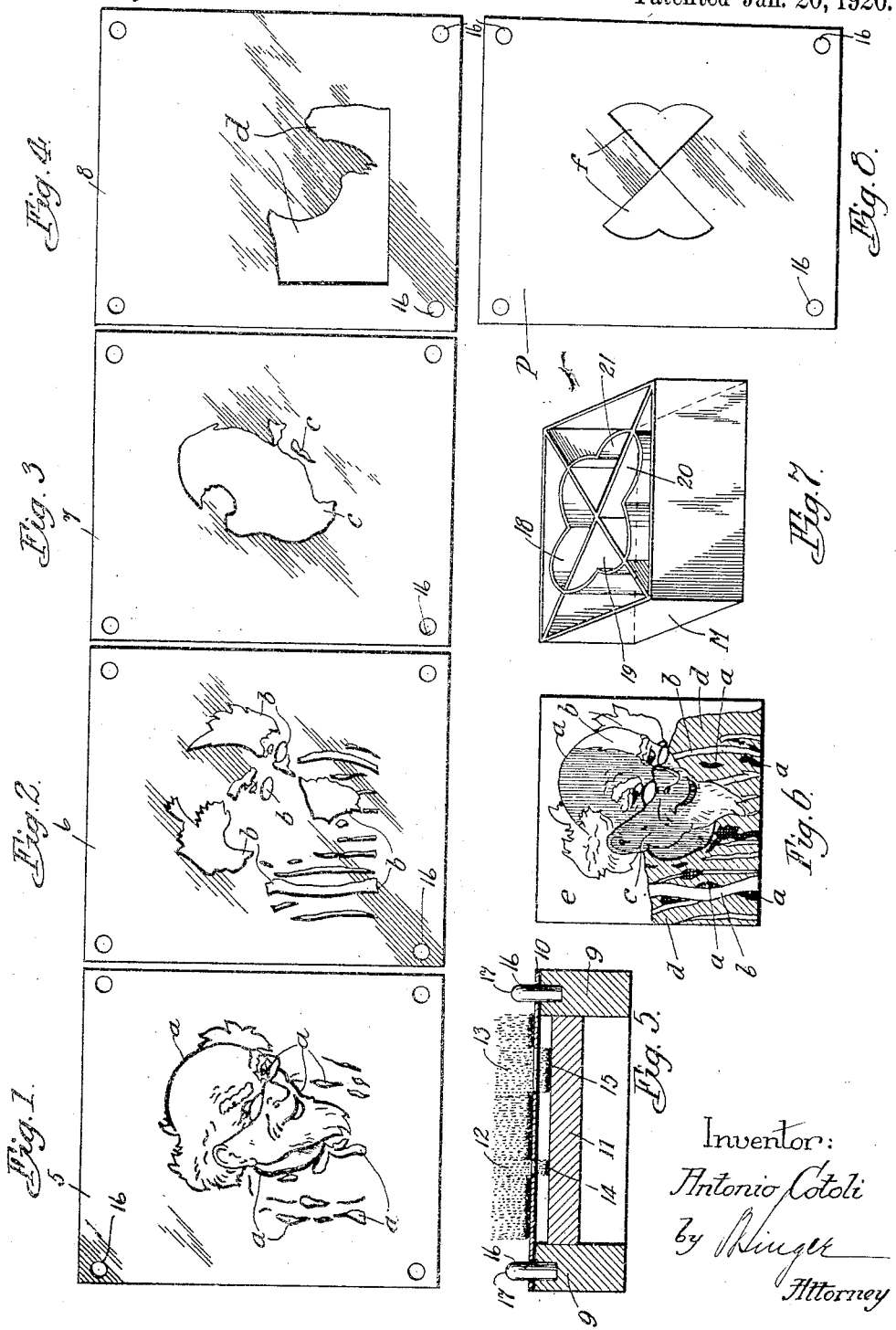

ANTONIO COTOLI, OF HABANA, CUBA.

METHOD OF AND MEANS FOR DISTRIBUTING PIGMENTS.

1,328,368.

Specification of Letters Patent.

Patented Jan. 20, 1920.

Application filed January 13, 1919. Serial No. 270,849.

*To all whom it may concern:*

Be it known that I, ANTONIO COTOLI, a subject of the King of Spain, residing at Habana, in the Republic of Cuba, have invented a new and useful Improvement in Methods of and Means for Distributing Pigments, of which the following is a specification.

The invention relates to a method of and means for distributing powdered pigment as employed in the coloring of the surface of slabs, tiles or other articles where a certain design, figure or illustration is to be reproduced in colors on the surface and which is effected by mixing the pigments with clay, loam, concrete, cement or any other plastic material in order to give the necessary coloring to the surface of the articles.

It is an object of the invention to provide a method of distributing pigments so that the coloring material is spread over an area, the outlines of which correspond to a predetermined design.

It is a further object of the invention to enable the quick distribution of superposed layers of pigments when several pigments of different color values are to be provided for multicolored designs.

It is also an object of the invention to provide a novel method of distributing pigments whereby geometrical figures may easily be obtained.

A further object of the invention aims at the provision of improved means for distributing pigments.

The invention furthermore aims at the provision of a series of plates having apertures to correspond to the designs to be obtained wherethrough the pigment is permitted to flow onto the articles to be colored.

With this and other objects in view which will become apparent as the description proceeds, the means for carrying out the method are illustrated in the accompanying drawing, in which:

Figures 1, 2, 3 and 4 show a series of plates having cut-out portions corresponding to the contours of sections of the design so that when coloring matter of different values is successively spread over the plates the desired distribution of the various pigments on the article is effected.

Fig. 5 is a vertical section through the casing employed for making tiles with a tile shown in the casing and with a distributing plate located above the same and permitting the passage of the pigment to the tile.

Fig. 6 illustrates a top plan view of a colored tile made by the agency of the plates illustrated in Figs. 1 to 4.

Fig. 7 illustrates a mold now used for the manufacture of tiles having thereon a geometrical figure.

Fig. 8 illustrates a plate with cut-out portions corresponding to the diametrical compartments of the mold shown in Fig. 7.

In carrying out the improved method a plurality of plates for distributing powdered pigment are used and the number of plates employed depends on the number of colors to appear in the figure, drawing or design to be reproduced on the surface of an article. The distributing plates for the powdered pigment may be made of metal, card board, wood or any other material suitable for the present purpose but preferably metal is employed.

In the application of my invention if a figure such as shown in Fig. 6 is to be reproduced on the surface of an article such as a tile, it is first necessary to determine the number of distinct colors of which the figure is composed. If for instance four different colors are used, a like number of plates is employed which are indicated in Figs. 1 to 4 and which are respectively designated by the numerals 5, 6, 7 and 8. The plate 5, shown in Fig. 1 is provided with a plurality of cut-out portions and corresponding with those parts of the figure which are held in black, such as the contour lines, the shade lines, etc. The plate 6, shown in Fig. 2 is provided with a plurality of perforations or cut-out portions corresponding to the white color present on the head and including parts of the forehead and of the eyebrows, the lenses of the spectacles, the white portions in the garment, etc. In the plate 7, as indicated in Fig. 3, a perforation or cut-out portion is shown which corresponds to the pink portion of the colored figure comprising the face and neck thereof. In plate 8, as shown in Fig. 4, a cut-out portion *d* is provided corresponding to the contour of the shirt shown in the figure.

After having formed the plates with the described cut-out portions they are successively arranged in a casing 9 in which for instance the cement tiles 11 are made.

In Fig. 5 a plate 10 indicative of any of the four plates, 5, 6, 7 or 8 is shown in functional position, in which the distribution of the powdered pigment may be effected to result in the figure shown in Fig. 6. In the casing 9 the tile 11 is arranged at a suitable height thereof in conformity with special requirements and subsequent thereto any one of the plates is arranged on the casing.

When a design is to be produced, first a suitable plate containing perforations is arranged on the casing and this plate is provided with four apertures 16 at the corners to receive dowel pins 17 projecting from the casing 9 whereby proper arrangement of the plate on the casing is insured. After the plate has been arranged in functional position and in true relation with the cement tile, the pigments 12, 13 are distributed over the plate and while spreading the pigment it accumulates on the cement tile and arranges itself to form an outline corresponding to the opening or perforation provided in the plate.

To produce the figure shown in Fig. 6 on a cement tile 11 the plate 5 is placed in the position occupied by the plate 10 and thereupon a black pigment is spread over the plate which then drops through the perforations $a$ onto the surface of the tile 11 forming thereon a layer of convenient thickness. Subsequently the plate 5 is removed and the plate 6 is placed in functional position and white pigment is heaped on the plate to pass through the cut-out portions $b$. The layer of the black pigment which has been distributed on the tile 11 by the agency of the plate 5 is partly covered by the layer of pigment applied through the plate 6.

Finally the same operations are executed with the plates 7 and 8 distributing the pigments of different color values over the layers arranged on the cement tile and conforming to the outlines as defined by the cut-out portions $c$ and $d$ respectively. After the plate 8 has been removed and spreading of the pigment has been terminated a pigment of that color may be provided on the tile which is to make up the back ground $e$ and which covers portions of the surface provided with pigment for the plates 5, 6, 7 and 8. All the colors are now distributed on the tile and form the figure as indicated by the reference characters $a$ to $e$ in Fig. 6. The tile is then ready for further treatment to make a lasting picture on the surface but as these steps of the method do not form part of the subject matter of the invention, further reference thereto is deemed superfluous.

My improved method is also applicable in connection with molds for forming geometrical figures on tiles such as is the case when for instance mosaic work is to be produced. As indicated in Fig. 7 a mold M is provided which is divided into compartments 18, 19, 20 and 21. If the figure defined by these compartments is to be executed in several colors a like number of plates is arranged, each of which designated by P has a cut-out portion or perforation $f$ adapted to be placed in registry with a compartment of the mold. In the example shown in Figs. 7 and 8 the plate P has a perforation $f$ which is identical with diametrical opposite compartments such as 18 and 20 or 19 and 21. In spreading pigment over the plate P the former will drop through the perforation $f$ and will arrange itself on the tile underneath the mold M in conformity with the outlines of the perforation $f$. Subsequently another plate P is arranged on the mold replacing the first plate and having its perforations registering with the remaining compartments of the mold so that a different pigment can be placed on the tile corresponding to the outline of the remaining compartments. The manner of spreading or distributing the pigment on the plates may either be effected manually or by means of special devices. The number of plates employed in effecting proper distribution of the pigments may be determined not only from the number of colors in which the picture is to be reproduced but also in accordance with the number of sections or portions of the figure to insure accuracy of arranging the pigments on the article.

The invention, of course, is not restricted to the execution of figures as shown in the drawing, but any design may be reproduced by the method described. It is also immaterial in which manner the plates are held above the article receiving the pigments and if preferred the dowel pins may be dispensed with and other means employed to hold the parts in registry with the article on which the figure is to be reproduced. The drawing and specification are merely indicative of the spirit of the invention aiming at the reproduction of the designs on articles and I, therefore, do not limit myself to the exact details of the method and to the sequence of steps as described but I claim my invention as broadly as the state of the art permits.

I claim:

1. The method of coloring a stationarily arranged surface to reproduce a design thereon, including the step of spreading a plurality of powdered pigments over a like number of plates spaced from said surface, each plate having perforations the outlines of which correspond to the design, and subjecting the surface to further treatment.

2. The method of reproducing a colored design on a surface stationarily arranged, including the step of spreading a plurality of powdered pigments over a like number of plates successively arranged in registering relation to the surface receiving the design and spaced therefrom at suitable distances to permit the pigments to drop onto the surface with an impact, each of said plates containing cut-out portions coextensive with portions of the design receiving a particular color.

3. In means for distributing pigments in producing colored designs on a surface, a frame maintaining said surface therein in horizontal position below the upper edge of said frame, a plurality of plates each having cut-out portions coextensive with portions of the design receiving a particular color, said plates being adapted to be placed on the top edge of said frame in spaced but registering relation to said surface, and means for maintaining the cut-out portions of said plates in registering relation with respect to corresponding design portions.

4. In means for distributing pigments in producing colored designs on a surface, a stationary frame maintaining said surface therein in horizontal position below the upper edge of said frame, a plurality of plates each having cut-out portions coextensive with portions of the design receiving a particular color, said plates being adapted to be placed on the top edge of said frame to be maintained in spaced relation to said surface and being provided with apertures adjacent to its corners, and dowel pins upstanding from the upper edge of the frame and extending through the apertures of the plates to maintain the latter in registering relation with respect to corresponding design portions.

In witness whereof I affix my signature.

ANTONIO COTOLI.